US012730472B2

(12) United States Patent
Oetlinger

(10) Patent No.: US 12,730,472 B2
(45) Date of Patent: Sep. 8, 2026

(54) DOCKING AND LOCKING MECHANISM AND METHOD OF MANUFACTURING

(71) Applicant: Controlled Dynamics, Inc., Grafton, WI (US)

(72) Inventor: Frank Oetlinger, Grafton, WI (US)

(73) Assignee: Controlled Dynamics, Inc., Grafton, WI (US)

( * ) Notice: Subject to any disclaimer, the term of this patent is extended or adjusted under 35 U.S.C. 154(b) by 0 days.

(21) Appl. No.: 19/246,075

(22) Filed: Jun. 23, 2025

(65) Prior Publication Data

US 2025/0315074 A1 Oct. 9, 2025

Related U.S. Application Data

(63) Continuation of application No. 18/163,337, filed on Feb. 2, 2023, now Pat. No. 12,339,694.

(60) Provisional application No. 63/267,579, filed on Feb. 4, 2022.

(51) Int. Cl.
*G05G 9/00* (2006.01)

(52) U.S. Cl.
CPC .......... *G05G 9/00* (2013.01); *Y10T 74/20468* (2015.01)

(58) Field of Classification Search
CPC ......... G05G 9/00; F16B 7/22; B60N 2/01541; B60N 2/01583; Y10T 74/20468
USPC ............................................ 70/106; 403/377
See application file for complete search history.

(56) References Cited

U.S. PATENT DOCUMENTS 470,976 A * 3/1892 Borchers .................. B61G 3/16 213/215
2,337,970 A * 12/1943 Cassell ................ A01K 27/005 119/799
5,765,894 A * 6/1998 Okazaki ................. B60N 2/206 297/378.13

* cited by examiner

*Primary Examiner* — Thomas C Diaz
(74) *Attorney, Agent, or Firm* — Ziolkowski Patent Solutions Group, SC

(57) ABSTRACT

A docking and locking mechanism includes a handle actuatable between a docked position and an undocked position and an eccentric mechanism coupled to the handle, the eccentric mechanism having a rod that rotates in an eccentric path upon actuation by the handle. The docking and locking mechanism also includes a linkage assembly with a plurality of sleeves and linkage shafts coupling the rod of the eccentric mechanism to a docking lever assembly having a docking lever to enable actuation of the docking lever.

20 Claims, 9 Drawing Sheets

3A
10
14
16
18
20
21
22
26
32
38
46
48
50
52
54
56
58
66
72
74, 101
76
78
80
82
84
86
88
88, 110
89
90
92
94
96
98, 100
102
104, 108
106
112
114
120
122
128
130

DOCKING AND LOCKING MECHANISM AND METHOD OF MANUFACTURING

CROSS-REFERENCE TO RELATED APPLICATIONS

The present application is a continuation of and claims priority to U.S. patent application Ser. No. 18/163,337, filed Feb. 2, 2023, which is a non-provisional of and claims priority to U.S. Provisional Patent Application Ser. No. 63/267,579, filed Feb. 4, 2022, the disclosures of which are incorporated herein by reference in their entirety.

BACKGROUND OF THE INVENTION

Embodiments of the present invention relate to a docking and locking mechanism, and, more particularly, to a docking and locking mechanism using an eccentric mechanism.

Various organizations have a need for docking various objects at different types of facilities. The objects that may benefit from docking are varied and numerous. As non-limiting examples, organizations may desire objects, such as, for example, carts, crates, boxes, or machines, to be docked and locked in place so that they can be more easily loaded, unloaded, or operated, do not become misplaced, or inadvertently block a path through a facility and, therefore, lower efficiency. Such docking needs may be present in buildings such as, for example, storage facilities, manufacturing facilities, medical facilities, and the like.

While a need exists for docking objects, currently available mechanisms for keeping objects in place are frequently inconvenient, not suitable for the object intended to be docked, or not suitable for the circumstances under which docking is desired. For example, hook and loop fasteners or tape might be used to keep an object in position, but they both are generally not strong enough to use with large or heavy objects or machines. Further, depending on the number of uses per day, hook and loop fasteners may need to be replaced often and may create an unpleasant noise when undocking an object. Also, tape is typically meant to be a more permanent solution for keeping an object in place and commonly leaves a residue on an object when it is removed. Thus, using tape as a temporary docking mechanism would be undesirable.

Rope or tie down straps may be another option to tie objects in position. However, personnel will likely not like to carry around rope or tie down straps or continuously retrieve them as needed. Also, with respect to rope, some objects may require a strong knot that takes too long to tie and untie for rope to be a practical solution. Regarding tie down straps, they may be effective for large objects or machines in some circumstances, but they may be inconvenient or impossible to use where no brackets or hooks are available to support them.

In addition, various types of carts may have brakes on them to prevent them from rolling away due to the slope of the floor or personnel accidentally bumping into them. These brakes are often on the wheels of the carts, and personnel will need to activate the brakes using their feet or to bend down and activate them by hand. In many cases, these brakes are inconvenient for personnel because the brakes must be activated on all wheels of a cart individually while the cart continues to move. Additionally, even when personnel can activate the brakes using their feet, it may be difficult to do so due to their configurations.

For example, when personnel must activate a brake on a particular side of a wheel and that side of the wheel becomes positioned underneath the cart while the cart is being moved or adjusted, the personnel must continue to adjust the cart until the wheel reaches the desired position. As another example, the brakes may simply be difficult to activate with a foot due to its size, shape, and/or location on the wheel. Therefore, in order to ensure that the brakes operate effectively, personnel may need to activate the brakes by hand, which may lead to personnel continuously bending down to activate the brakes by hand or to personnel refraining from using the brakes altogether. Furthermore, even if the brakes are activated on a cart, the cart may still move by sliding along the floor rather than rolling, especially if the cart is lightweight, the floor has a slope, or the brakes are old and in need of replacement. Hence, the present status of docking and locking mechanisms is in need of improvement.

It would therefore be desirable to provide a docking and locking mechanism that is easy to use, convenient, reliable, efficient, and effective for use with various objects over short or long periods of time.

BRIEF STATEMENT OF THE INVENTION

Embodiments of the present invention are directed to a docking and locking mechanism utilizing an eccentric mechanism to reliably hold objects in position.

In accordance with one aspect of the invention, a docking and locking mechanism includes a handle actuatable between a docked position and an undocked position. The docking and locking mechanism further includes an eccentric mechanism including an axle coupled to the handle and configured to rotate about an axis of rotation upon actuation of the handle, a sheave coupled to the axle and configured to rotate about the axis of rotation with the axle, and a rod comprising a first end coupled to the sheave off-center from the axis of rotation and a second end, the rod extending substantially perpendicular to the axis of rotation. Additionally, the docking and locking mechanism includes a linkage assembly including a first linkage shaft coupled to the second end of the rod of the eccentric mechanism, the first linkage shaft comprising a first shaft opening therein; an inner sleeve comprising a first sleeve opening and a second sleeve opening, the inner sleeve positioned over the first linkage shaft and coupled to the first linkage shaft via a first sleeve pin extending through the first sleeve opening in the inner sleeve and the first shaft opening of the first linkage shaft; a second linkage shaft positioned within the inner sleeve and coupled to the inner sleeve via a second sleeve pin extending through a second shaft opening in the second linkage shaft and the second sleeve opening in the inner sleeve; and an outer sleeve positioned over the inner sleeve to retain the first sleeve pin coupling the inner sleeve and the first linkage shaft, the outer sleeve linked to the inner sleeve and the second linkage shaft via the second sleeve pin extending through a third sleeve opening in the outer sleeve. The docking and locking mechanism also includes a docking lever assembly including first and second pivot pins and a docking lever with a first end coupled to the second linkage shaft of the linkage assembly via the first pivot pin extending through a third shaft opening in the second linkage shaft and a first lever opening in the docking lever; a second end comprising a hook shape; and a second lever opening formed therein and sized to receive the second pivot pin therethrough.

In accordance with another aspect of the invention, a method of manufacturing a docking and locking mechanism includes constructing a linkage assembly by coupling a first linkage shaft to an inner sleeve via a first sleeve pin extending through a first shaft opening in the first linkage shaft and a first sleeve opening in the inner sleeve, positioning an outer sleeve over the inner sleeve and the first linkage shaft to retain the first sleeve pin in the inner sleeve and the first linkage shaft, and coupling a second linkage shaft to the inner sleeve and outer sleeve via a second sleeve pin extending through a second shaft opening in the second linkage shaft, a second sleeve opening in the inner sleeve, and a third sleeve opening in the outer sleeve. In addition, the method includes coupling a docking lever assembly to the linkage assembly by inserting a first pivot pin through a first lever opening in a docking lever of the docking lever assembly and a third shaft opening in the second linkage shaft. Furthermore, the method includes coupling an eccentric mechanism comprising an axle, a sheave, and a rod to the linkage assembly by coupling the first linkage shaft of the linkage assembly to the rod of the eccentric mechanism, the rod of the eccentric mechanism coupled to the sheave of the eccentric mechanism off-center from an axis of rotation about which the sheave and axle of the eccentric mechanism rotate and coupling a handle to the axle of the eccentric mechanism, the handle actuatable between a docked position and an undocked position.

In accordance with yet another aspect of the invention, a docking and locking mechanism including a handle actuatable between a docked position and an undocked position and an eccentric mechanism coupled to the handle, the eccentric mechanism comprising a rod that rotates in an eccentric path upon actuation by the handle. The docking and locking mechanism also includes a linkage assembly with an inner sleeve comprising first and second sleeve openings, an outer sleeve positioned around the inner sleeve and comprising a third sleeve opening, first and second linkage shafts partially positioned within the inner sleeve and comprising respective first and second openings therein, a first sleeve pin extending through the first sleeve opening in the inner sleeve and the first opening in the first linkage shaft, and a second sleeve pin extending through the second sleeve opening in the inner sleeve, the third sleeve opening in the outer sleeve, and the second opening in the second linkage shaft. The docking and locking mechanism further includes a docking lever with a first end coupled to the second linkage shaft of the linkage assembly via a first pivot pin and an elongated opening formed therein and sized to receive a second pivot pin therethrough.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the present invention provide for a docking and locking mechanism and method for making the same. The docking and locking mechanism includes an eccentric mechanism selectively rotated by a handle. As a user actuates the handle from an undocked position to a docked position, the eccentric mechanism exerts a force on a linkage assembly and a docking lever assembly coupled to the linkage assembly. As the eccentric mechanism pulls the linkage assembly toward itself, a docking lever assembly moves from an undocked position to a docked position in which it is configured to engage a pin in a docking receiver assembly and dock and lock in place the docking and locking mechanism and the object to which it is coupled.

Figure 1:
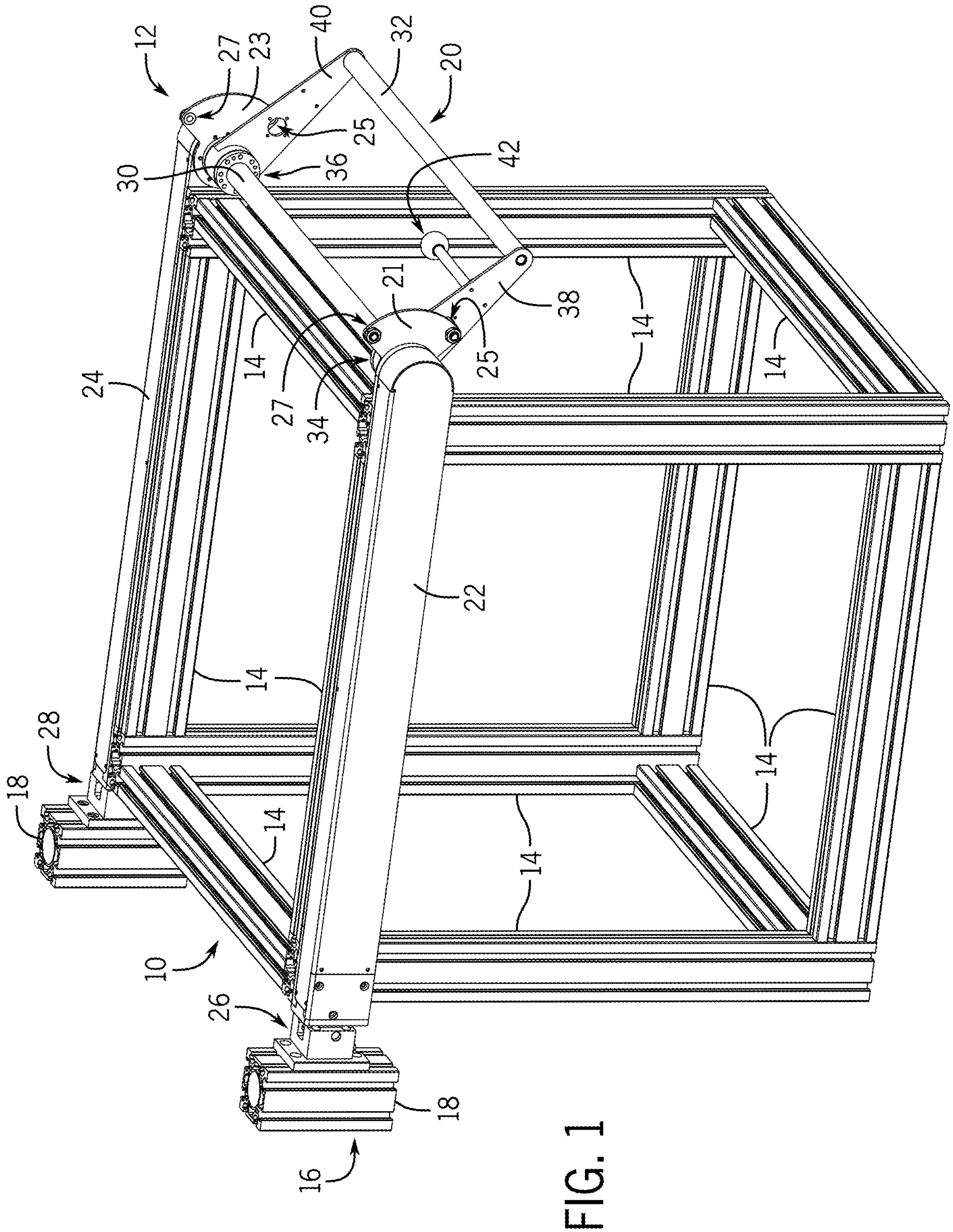
FIG. 1 is a perspective view of a docking and locking mechanism on an object and docked on an apparatus, according to an embodiment of the invention.

Referring to FIG. 1, an object 10 with a docking and locking mechanism 12 coupled thereto is shown, according to an embodiment of the invention. Object 10 is represented by a number of beams 14 that form a box-like shape. Thus, object 10 may be a crate, a cart, or other similar object. However, the use of docking and locking mechanism 12 is not limited to such objects and may be used with a variety of other object, according to the need of a user. In FIG. 1, object 10 is docked and locked in place at an apparatus 16 represented by two beams 18. Apparatus 16 may be a variety of different apparatuses such as, for example, a work bench, a wall, a shelf, a platform, or another suitable apparatus.

Docking and locking mechanism 12 includes a handle 20, first and second locating plates 21, 23 each having a docked position opening 25 and an undocked position opening 27, first and second housings or casings 22, 24, and first and second docking receiver assemblies 26, 28. However, in some embodiments, docking and locking mechanism 12 may include a different dumber of housings and docking receiver assemblies. As a non-limiting example, where object 10 is a smaller object, docking and locking mechanism 12 may include only first housing 22 and first docking receiver assembly 26. As another non-limiting example, where object 10 is a larger object, docking and locking mechanism 12 may include a third housing (not shown) and a third docking receiver assembly (not shown).

A user of docking and locking mechanism 12 may selectively actuate handle 20 to move docking and locking mechanism 12 between a docked position or state in which docking and locking mechanism 12 may dock and lock object 10 in place with respect to apparatus 16 and an undocked position or state in which object 10 may be moved freely. Handle 20 includes first and second handle shafts 30, 32 substantially parallel with each other. First handle shaft 30 has first and second retaining assemblies 34, 36 positioned thereon, and first and second plates 38, 40 couple second handle shaft 32 to first handle shaft 30 via first and second retaining assemblies 34, 36, respectively. First and second retaining assemblies 34, 36 couple first handle shaft 30 to first and second housings 22, 24, respectively. Handle 20 further includes a locking lever assembly 42 coupled to first plate 30. Locking lever assembly 42, in conjunction with docked position opening 25 and undocked positioned opening 27 in first locating plate 21, locks handle 20 in either the docked position or the undocked position. In FIG. 1, handle 20 is in the docked position. While not shown in FIG. 1, handle 20 may include a second locking lever assembly coupled to second plate 32 at an opening 44 and configured to interact with second locating plate 23. Though, in various embodiments, second plate 32 may be formed without opening 44 and/or second locating plate 23 may not be included in docking and locking mechanism 12.

Figure 2:
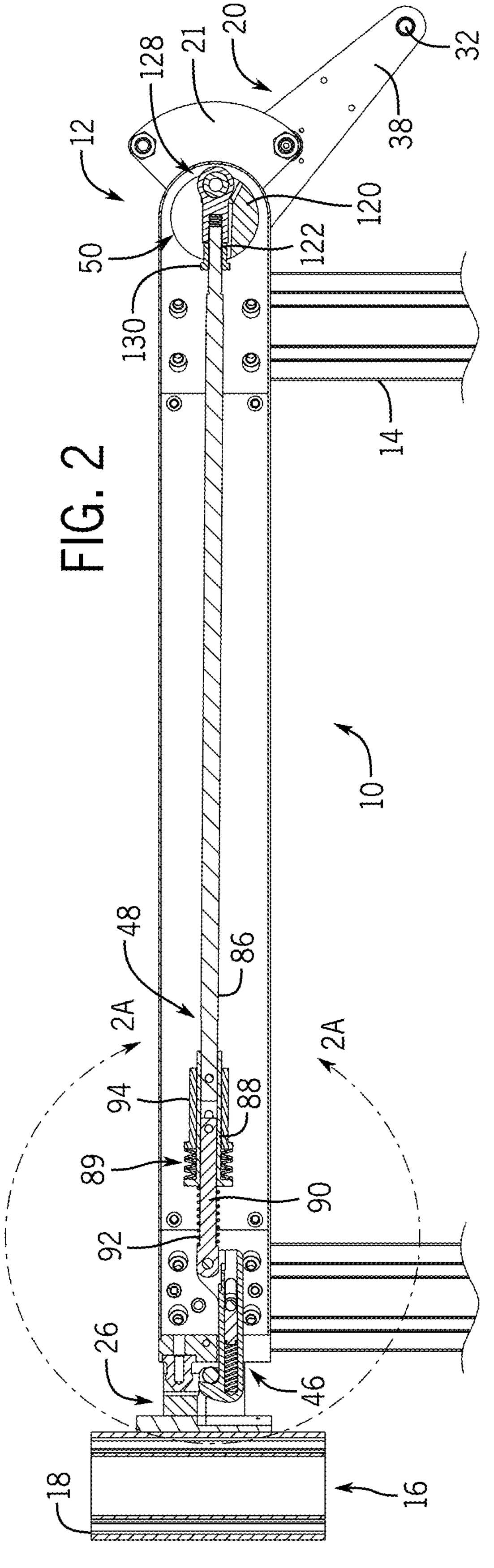
FIG. 2 is a side cross-sectional view of the apparatus of FIG. 1 with the docking and locking mechanism in the docked position, according to an embodiment of the invention.
Figure 2A:
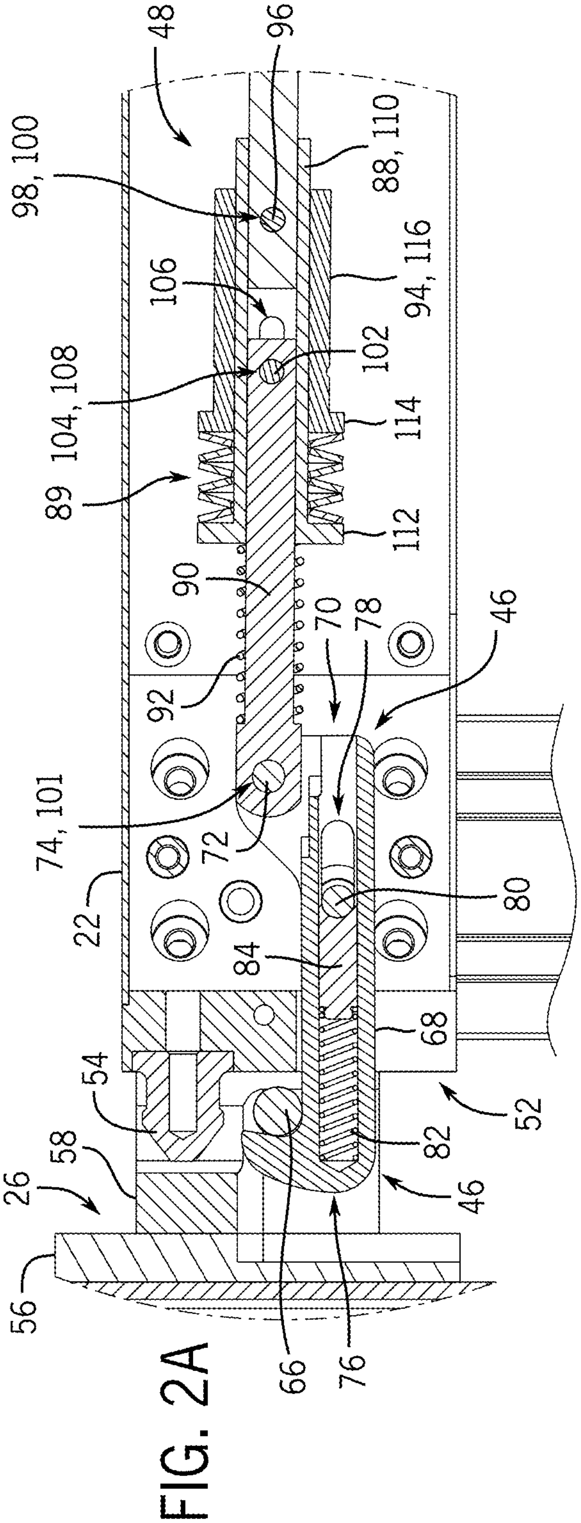
FIG. 2A is an enlarged view of portion 2A in FIG. 2 showing a docking end of the docking and locking mechanism in the docked position.
Figures 3, 3A:
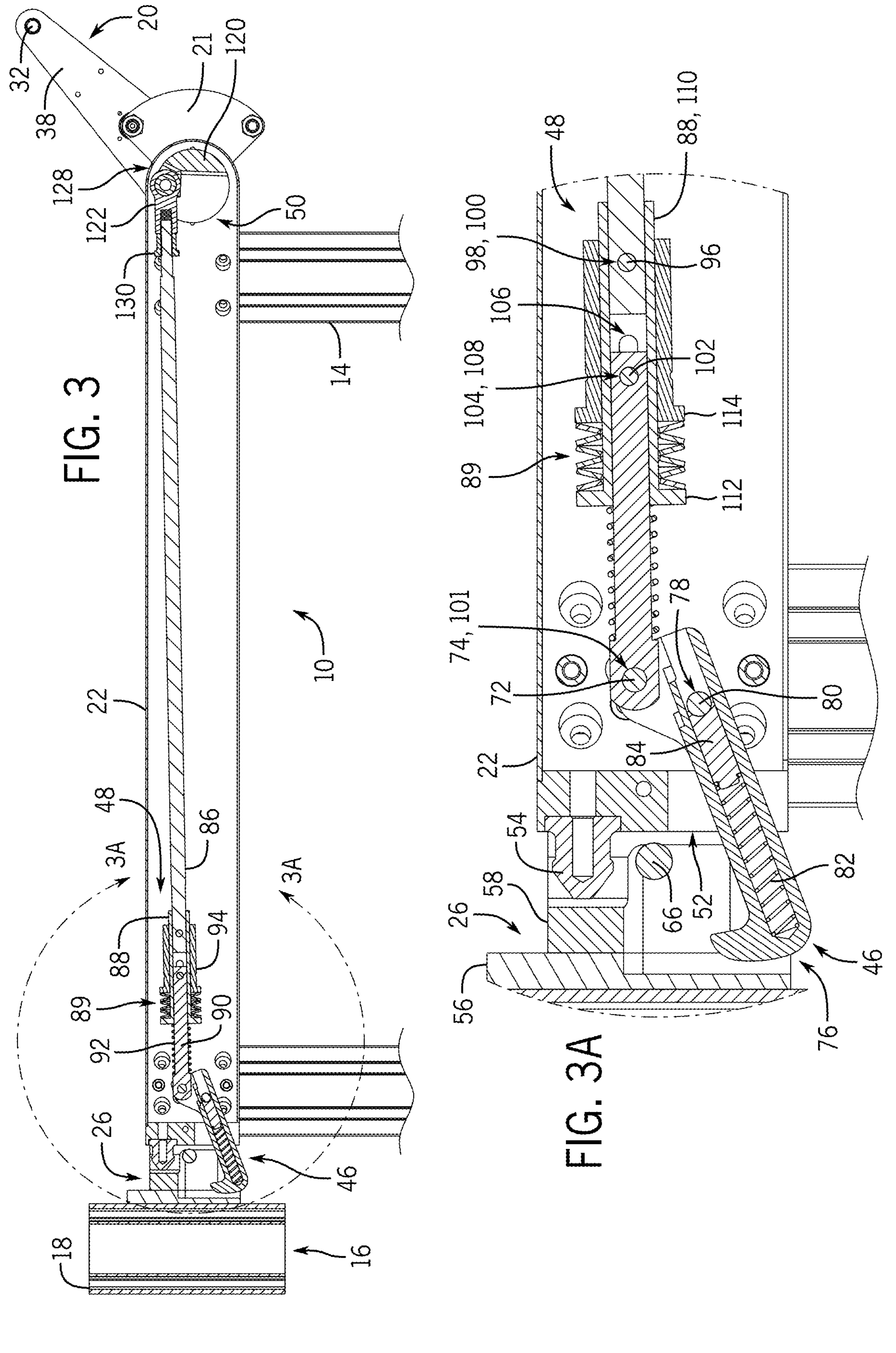
FIG. 3 is a side cross-sectional view of the apparatus of FIG. 1 with the docking and locking mechanism in an undocked position, according to an embodiment of the invention.
FIG. 3A is an enlarged view of portion 3A in FIG. 2 showing a docking end of the docking and locking mechanism in the undocked position.

The structure and operation of docking and locking mechanism 12 will now be described further with respect to FIGS. 2-10. Referring first to FIGS. 2 and 3, side cross-sectional views of object 10, docking and locking mechanism 12, and apparatus 16 are shown, according to embodiments of the invention. FIG. 2 illustrates docking and locking mechanism 12 in the docked position, and FIG. 3 illustrates docking and locking mechanism 12 in the undocked position. FIGS. 2A and 3A illustrate enlarged views of portions 2A and 3A in FIGS. 2 and 3, respectively, for purposes of clarity. The cross-sectional views of FIGS. 2-3A are taken through housing 22 and first docking receiver assembly 26 of docking and locking mechanism 12. Thus, docking and locking mechanism 12 will be described with respect to the components present in housing 22 and first docking receiver assembly 26. However, housing 24 and docking receiver assembly 28 of docking and locking mechanism 12 will include the same arrangement of components as housing 22 and docking receiver assembly 26, respectively. Thus, the description of the components of housing 22 and docking receiver assembly 26 is fully applicable to the components of housing 24 and docking receiver assembly 28.

As shown in FIGS. 2-3A, housing 22 of docking and locking mechanism 12 at least partially houses a docking lever assembly 46, a linkage assembly 48, and an eccentric mechanism 50. It is the interaction between docking lever assembly 46, linkage assembly 48, eccentric mechanism 50, handle 20, and docking receiver assembly 26 that enables docking and locking mechanism 12 to move between the docked and undocked positions. As docking and locking mechanism 12 is described further below with respect to FIGS. 2-3A, additional reference will be made to FIGS. 4-7, which illustrate the various components of docking and locking mechanism 12 in more detail.

Figure 4:
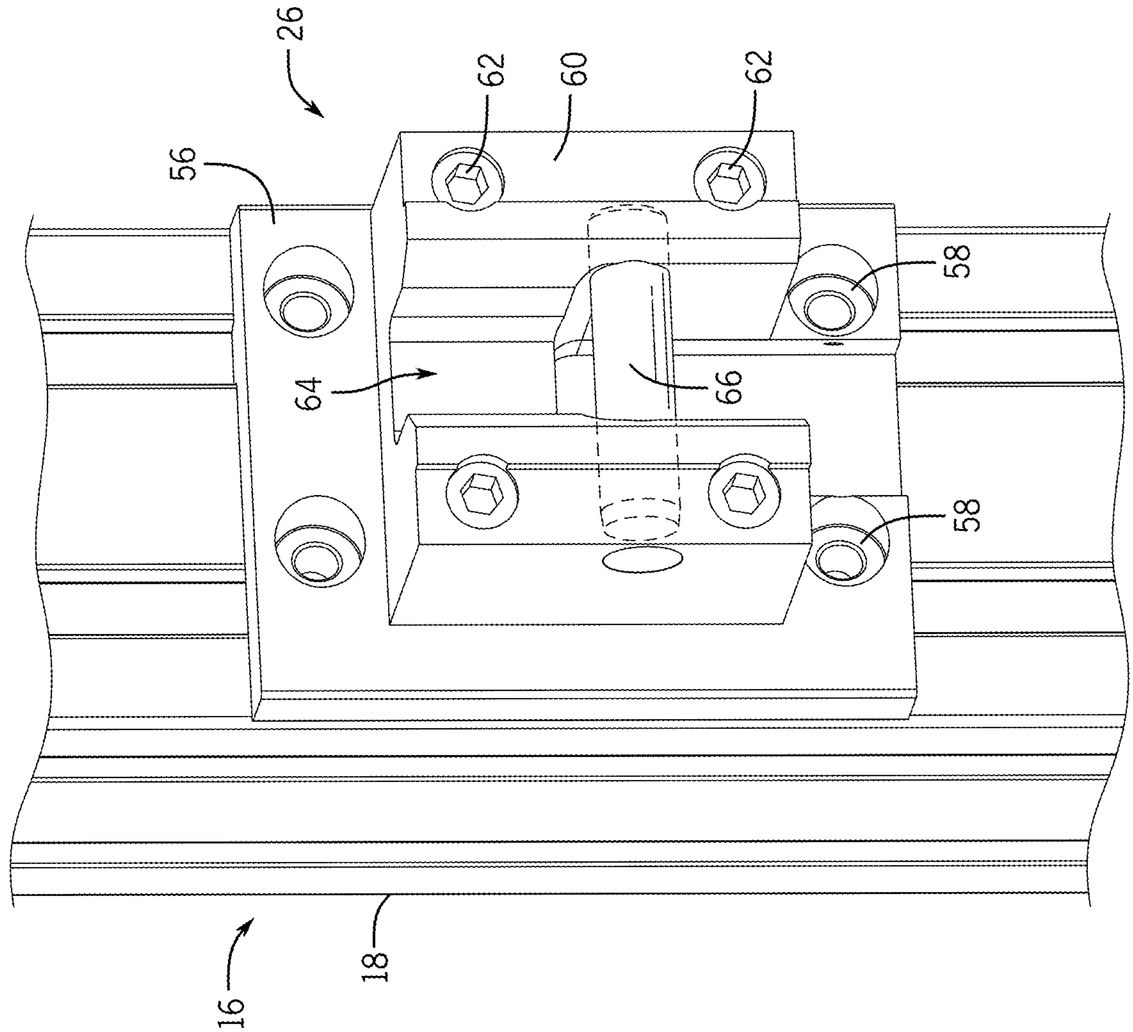
FIG. 4 is a perspective view of a docking receiver assembly of the docking and locking mechanism of FIG. 1, according to an embodiment of the invention.
Figure 5:
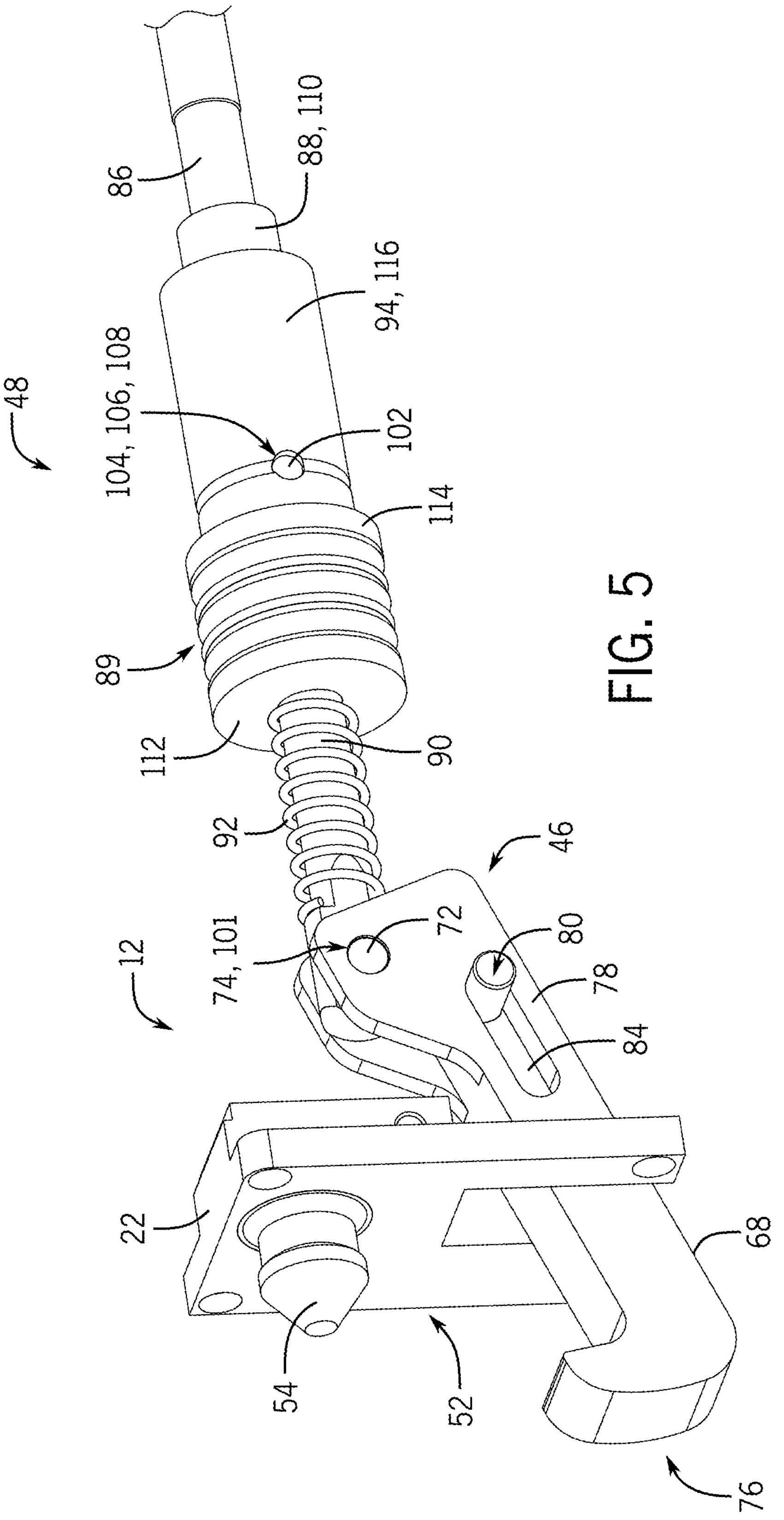
FIG. 5 is a perspective view of the docking and locking mechanism of FIG. 1 at a docking end thereof, according to an embodiment of the invention.
Figure 6:
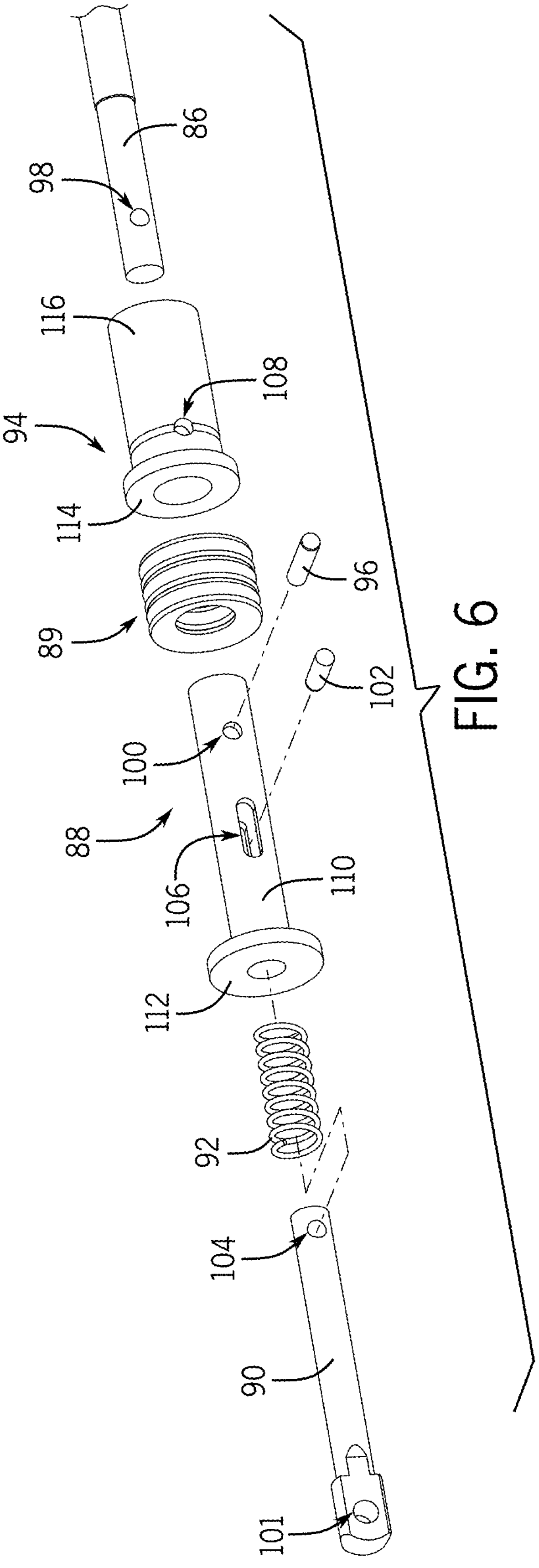
FIG. 6 is an exploded view of a linkage assembly of the docking and locking mechanism of FIG. 1, according to an embodiment of the invention.
Figure 7:
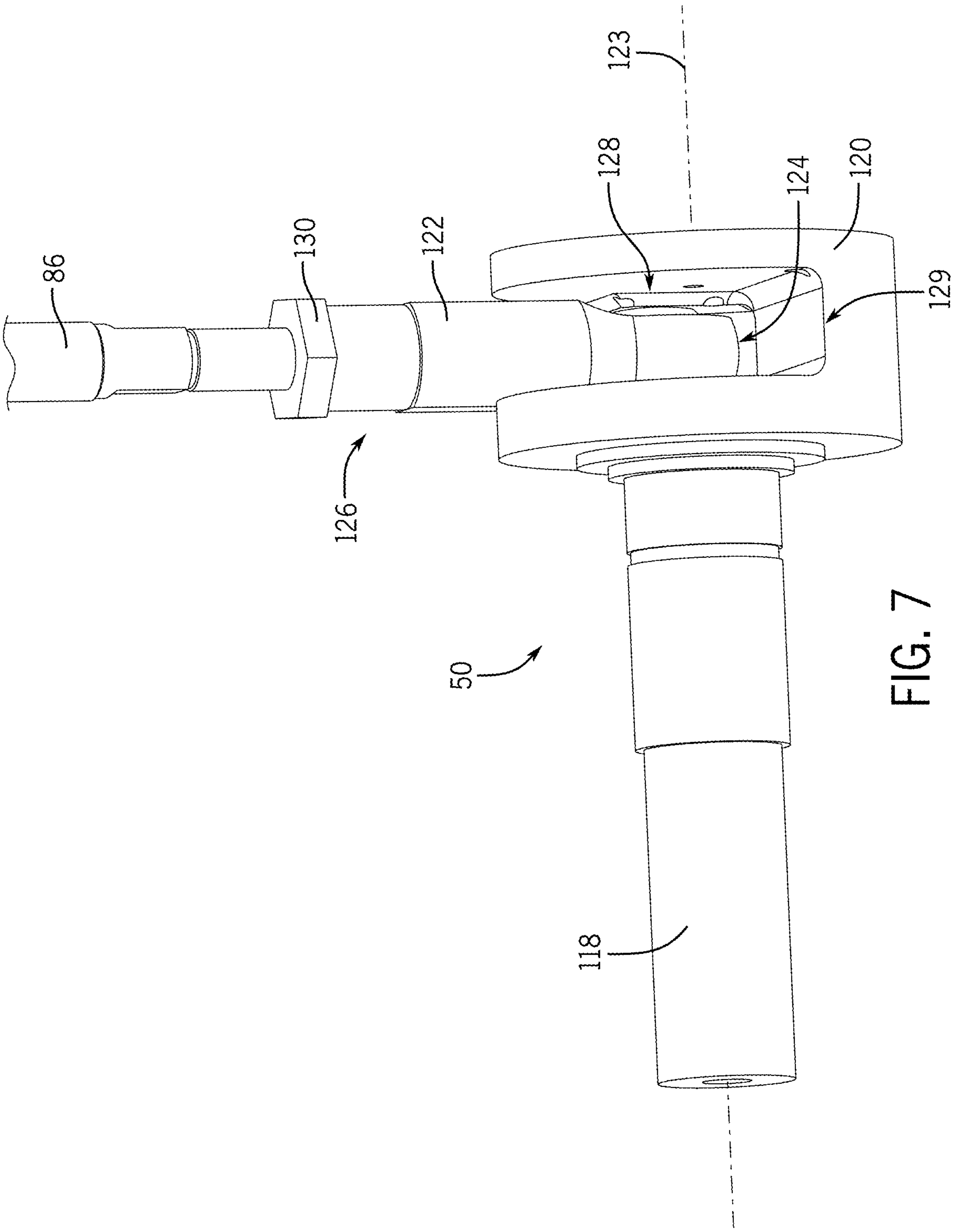
FIG. 7 is a bottom perspective view of an eccentric mechanism of the docking and locking mechanism of FIG. 1, according to an embodiment of the invention.

More specifically, FIG. 4 shows a perspective view of first docking receiver assembly 26, according to an embodiment of the invention. FIG. 5 shows a perspective view of docking lever assembly 50 at a docking end 52 of docking and locking mechanism 12, according to an embodiment of the invention. FIG. 6 shows an exploded view of linkage assembly 48, according to an embodiment of the invention. FIG. 7 shows a perspective view of eccentric mechanism 50, according to an embodiment of the invention.

As shown in FIGS. 2-3A, with reference also to FIGS. 4 and 5, docking lever assembly 50 is configured to engage docking receiver assembly 26 along with a docking alignment pin 54 at docking end 52 of housing 22 of docking and locking mechanism 12. As shown most clearly in FIG. 4, docking receiver assembly 26 includes a mounting bracket 56 coupled to beam 18 of apparatus 16 via a plurality of fasteners 58. Docking receiver assembly 26 further includes a receiver bracket 60 coupled to mounting bracket 56 via a plurality of fasteners 62. Receiver bracket 60 includes a substantially vertical notch 64 extending through its center and a docking pin 66 extending substantially horizontally through notch 64. Notch 64 is sized to receive docking alignment pin 54 above docking pin 66. Docking alignment pin 54 provides for left and right or side-to-side alignment of docking and locking mechanism 12 to ensure proper placement of object 10 with respect to apparatus 16.

As shown in FIGS. 2-3A, and 5, docking lever assembly 50 includes a docking lever 68 having a first end 70 coupled to linkage assembly 48 via a first pivot pin 72 extending through openings 74 and a second hook-shaped end 76 configured to engage docking pin 66 within notch 64 of receiver bracket 60 of docking receiver assembly 26. Docking lever 68 further includes an elongated opening 78 with a second pivot pin 80 extending therethrough. Within elongated opening 78, a spring 82 biases an interior pin 84 against second pivot pin 80 to establish second pivot pin 80 as a second pivot point for docking lever 68 when docking and locking mechanism 12 is moving between the docked and undocked positions.

With continued reference to FIGS. 2-3A and additional reference to FIGS. 5 and 6, linkage assembly 48 in housing 22 of docking and locking mechanism 12 will now be described. Linkage assembly 48 includes a first linkage shaft 86, an inner sleeve 88, a plurality of Belleville washers 89 positioned on inner sleeve 88, a second linkage shaft 90, a spring 92 positioned on second linkage shaft 90, and an outer sleeve 94. First linkage shaft 86 is coupled to inner sleeve 88 via a first sleeve pin 96 extending through an opening 98 in first linkage shaft 86 and a first opening 100 in inner sleeve 88. Second linkage shaft 90 is coupled to docking lever 68 of docking lever assembly 46 via first pivot pin 72 extending through an opening 101 in second linkage shaft 90 and coupled to inner sleeve 88 and outer sleeve 94 of linkage assembly 48 via a second sleeve pin 102 extending through an opening 104 in second linkage shaft 90, a second opening 106 in inner sleeve 88, and an opening 108 in outer sleeve 94. Second opening 106 in inner sleeve 88 is elongated such that second sleeve pin 102 may slide within elongated second opening 106 during actuation of handle 20.

Along with first opening 100 and elongated second opening 106, inner sleeve 88 includes a sliding portion 110 and a stopper end 112. Stopper end 112 of inner sleeve 88 has an extended radius with respect to sliding portion 110. Outer sleeve 94 is positioned over sliding portion 110 of inner sleeve 88 and includes a stopper end 114 similar to that of stopper end 110 of inner sleeve 88 and a retaining portion 116. Bellville washers are positioned on inner sleeve 88 between stopper end 110 of inner sleeve 88 and stopper end 114 of outer sleeve 94 such that stopper end 110 of inner sleeve 88 and stopper end 114 of outer sleeve 94 retain Bellville washers on sliding portion 110 of inner sleeve 88. Outer sleeve 94 slides along sliding portion 110 of inner sleeve 88 according to the movement of second sleeve pin 102 since second sleeve pin 102 extends through opening 108 in outer sleeve 94. However, retaining portion 116 of outer sleeve 94 is always positioned over first sleeve pin 96 so as to retain first sleeve pin 96 within opening 98 of first linkage shaft and first opening 100 of inner sleeve 88.

With continued reference to FIGS. 2-3A and additional reference to FIG. 7, eccentric mechanism 50 includes an axle 118, a sheave 120, and a rod 122. In docking and locking mechanism 12, axle 118 is integrally formed with sheave 120, but may be coupled to sheave 120 in another manner such as, for example, welding, in other embodiments. Axle 118 and sheave 120 are arranged such that they share an axis of rotation 123. Rod 122 includes first and second ends 124, 126, with first end 124 being coupled to sheave 120 via a ball joint connection 128 and second end 126 being coupled to first linkage shaft 86 of linage assembly 48 via a lock nut 130. Ball joint connection 128 is formed off-center from sheave 120 such that it does not align with the axis of rotation 123. Sheave 120 includes a notch 129 formed therein and sized so that rod 122 may move into and out of notch 129 as handle 20 is actuated by a user. That is, as a user actuates handle 20 from the docked position shown in FIGS. 2 and 2A to the undocked position shown in FIGS. 3 and 3A, rod 122 rotates counterclockwise along an eccentric path and moves at least partially out of or away from notch 129 of sheave 120. Similarly, as a user actuates handle 20 from the undocked position shown in FIGS. 3 and 3A to the docked positioned shown in FIGS. 2 and 2A, rod 122 rotates clockwise in an eccentric path and moves at least partially toward or into notch 129 of sheave 120.

Figure 9:
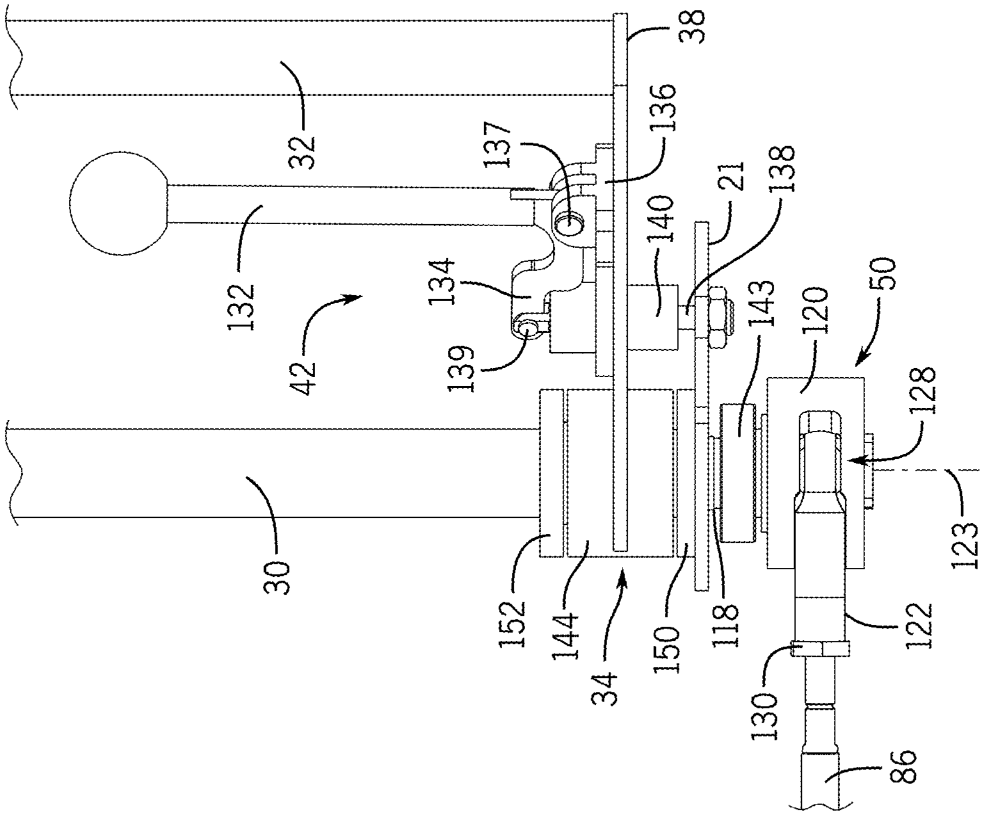
FIG. 9 is a top view of the handle, the locking lever assembly in a locked position, and the eccentric mechanism of the docking and locking mechanism of FIG. 1, according to an embodiment of the invention.
Figure 8:
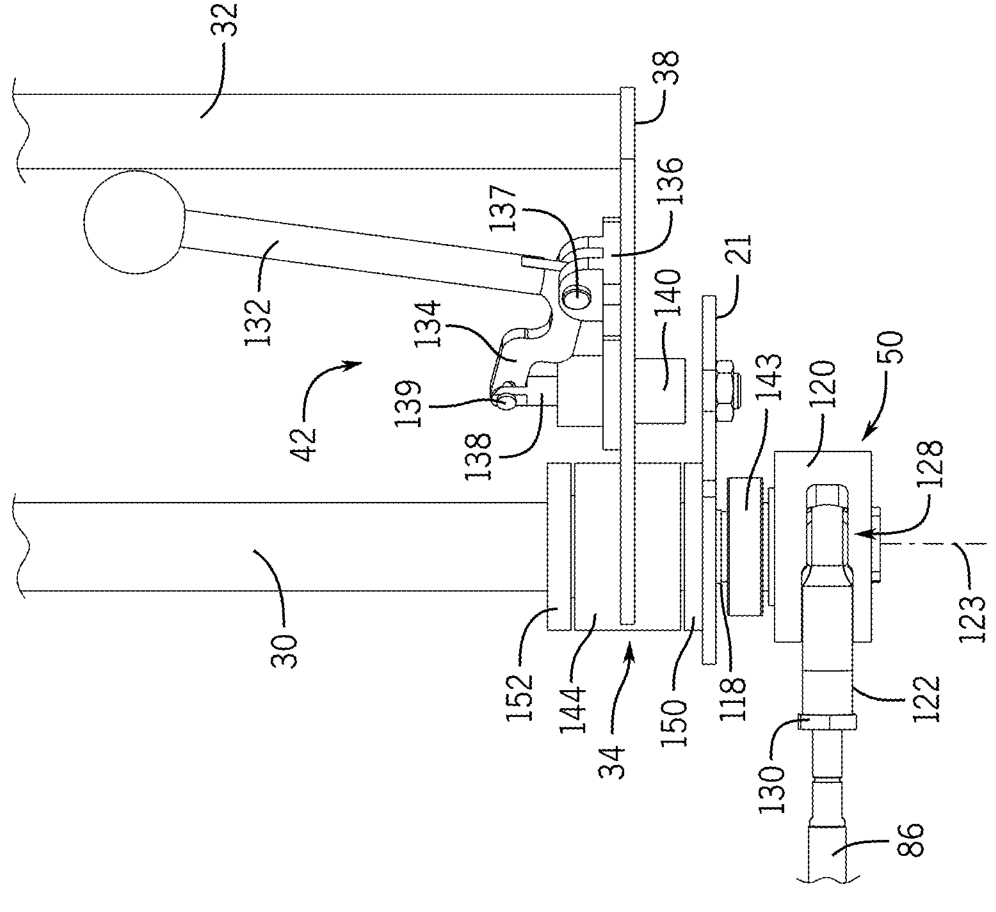
FIG. 8 is a top view of a handle, a locking lever assembly in an unlocked position, and the eccentric mechanism of the docking and locking mechanism of FIG. 1, according to an embodiment of the invention.

Referring now to FIGS. 8 and 9, a top view of handle 20, locking lever assembly 42, and eccentric mechanism 50 are shown, according to an embodiment of the invention. In FIG. 8, locking lever assembly 42 is in an unlocked position or state. In FIG. 9 locking lever assembly 42 is in a locked position or state. Locking lever assembly 42 includes a lever 132 coupled to first plate 130 of handle 20 via a linkage plate 134 and a mounting bracket 136, with a first pivot pin 137 extending through linkage plate 134 and mounting bracket 136 . . . . Locking lever assembly 42 further includes a locking pin 138 coupled to linkage plate 134 via a second pivot pin 139 extending through linkage plate 134 and locking pin 138. Locking pin 138 is positioned within a locking pin housing 140 along with a spring (not shown) that biases locking pin 138 toward first locating plate 21. Linkage plate 134 is coupled to mounting bracket 136 such that, when a user actuates lever 132, linkage plate 134 pivots at first pivot pin 137. In a similar manner, linkage plate 134 is coupled to locking pin 138 such that when the user actuates lever 132, linkage plate 134 pivots at second pivot pin 139.

This pivoting arrangement between linkage plate 134 and locking pin 138 allows a user to actuate locking pin 138 and to place locking lever assembly 42 in the locked position and the unlocked position. As shown in FIG. 9, in the locked position, locking pin 138 extends through one of docked position opening 25 and undocked position opening 27 of first locating plate 25 to lock docking and locking mechanism 12 in either the docked position or undocked position, respectively. As shown in FIG. 8, in the unlocked position, a user has actuated lever 132 to draw locking pin 138 out of either docked position opening 25 or undocked position opening 27 in first locating plate 25, at which point, the user may actuate handle 20 between the docked and undocked positions. Once a user begins to actuate handle 20 when locking lever assembly 42 is in the unlocked position, the user can release lever 132. As a result of the spring biasing locking pin 138 toward first actuating plate 21, releasing lever 132 will cause locking pin 138 to slide along first locating plate 21 until it reaches one of docked position opening 25 and undocked position opening 27. When locking pin 138 reaches one of docked opening 25 and undocked position opening 27, the spring will push locking pin 138 into the opening and place locking lever assembly 42 into the locked position.

FIGS. 8 and 9 also better illustrate the arrangement of handle 20 with respect to eccentric mechanism 50 within housing 22 (not shown in FIG. 8 or 9) of docking and locking mechanism 12. Initially, axle 118 of eccentric mechanism 50 extends through a radial bearing 143 when exiting housing 22 of docking and locking mechanism 12. Handle 20 is coupled to axle 118 of eccentric mechanism 50 via first handle shaft 30 and retaining assembly 34. That is, axle 118 of eccentric mechanism 50 extends into first handle shaft 30 of handle 120, and first retaining assembly 34 of handle 20 is positioned over axle 118 and first handle shaft 30 to couple them together via a friction clamp. Thus, as a user actuates handle 120, first handle shaft 130 rotates around axis of rotation 123, and the rotation of first handle shaft 130 causes axle 118 and sheave 120 of eccentric mechanism 50 to rotate around axis of rotation 123 as well.

Figure 10:
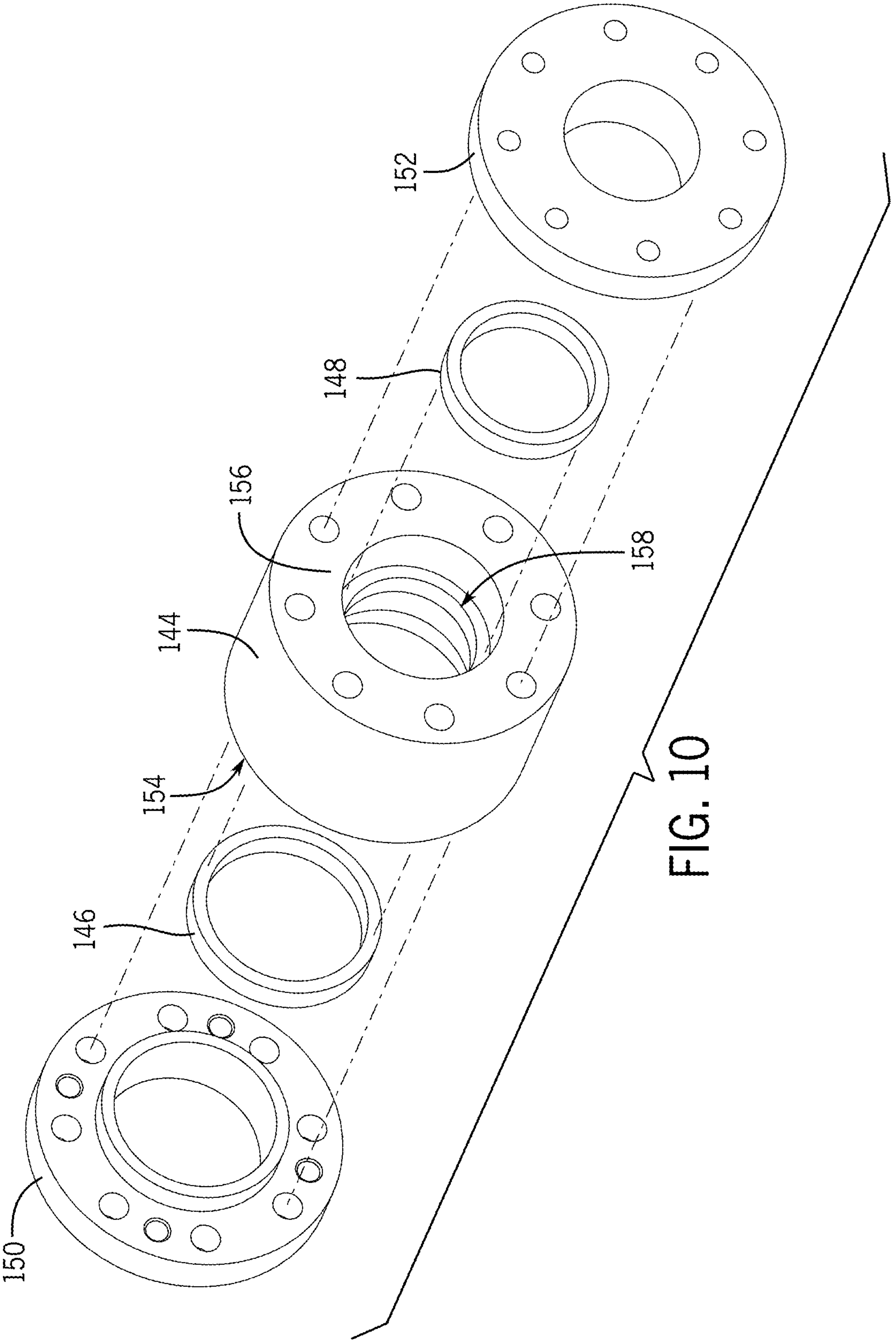
FIG. 10 is an exploded view of a retaining assembly of the docking and locking mechanism of FIG. 1, according to an embodiment of the invention.

Referring now to FIG. 10, an exploded view of first retaining assembly 34 of handle 20 is shown, according to an embodiment of the invention. First retaining assembly 34 includes a central collar 144, first and second taper locks 146, 148, and first and second flanges 150, 152. Collar 144 includes first and second edge openings 154, 156 on opposing sides thereof and a central opening 158 connecting the first and second edge openings 154, 156. While first and second taper locks 146, 148 are shown as individual rings, first and second taper locks 146, 148 will each be formed by a pair of clamping rings in some embodiments. First and second tapers locks 146, 148 fit through first and second edge openings, respectively, but stop within collar 144 at central opening 158. First and second flanges 150, 152 extend through first and second edge openings 154, 156, respectively, to hold the taper locks 146, 148 in position within collar 144. First and second flanges 150, 152 are mounted to collar 144 via a plurality of fasteners (not shown in FIG. 10) through openings 158 in collar 144 and first and second flanges 150, 152, first retaining assembly 34 forms a singular unit that creates the friction clamp over first shaft handle 30 of handle 20 and axle 118 of eccentric mechanism 50 such that first shaft handle 30 and axle 118 rotate in unison.

Referring now to FIGS. 2-3A and 8-9, the full operation docking and locking mechanism 12 will now be described with respect to the components within housing 22. As noted above, the same operation will take place within housing 24 of docking and locking mechanism 12 shown in FIG. 1. All references to clockwise or counterclockwise rotation and upward and downward motions are taken with respect to the views in FIGS. 2-3A for clarity. These directional indications should not be taken as limiting the invention in any way.

Initially, docking and locking mechanism 12 will start in the docked position shown in FIGS. 2 and 2A with locking lever assembly 42 in the locked position shown in FIG. 9. To release docking and locking mechanism 12 from the docked position, a user will first actuate lever 132 of locking lever assembly 42 to draw locking pin 138 out of docked position opening 25 of locating plate 21, and, therefore, move locking lever assembly 42 to the unlocked position shown in FIG. 8. Thereafter, the user will actuate handle 20 upward from the downward docked position with a counterclockwise rotation in order to release docking lever 68 of docking lever assembly 46 from around docking pin 66 in notch 64 of receiver bracket 60 of first receiver assembly 26.

That is, as handle 20 rotates counterclockwise, first retaining assembly 34 rotates first handle shaft 30 of handle 20 and axle 118 and sheave 120 of eccentric mechanism 50 counterclockwise. During this rotation, rod 122 of eccentric mechanism 50 will rotate counterclockwise with sheave 120 with an eccentric motion and move away from or out of notch 129. As rod 122 moves in this manner, rod 122 causes linkage assembly 48 to rotate. More specifically, rod 122 moves first linkage shaft 86 counterclockwise and toward docking assembly 46. This causes inner sleeve 88 to compress spring 92 and decrease pressure on Belleville washers 89 with outer sleeve 94. As inner sleeve 88 compresses spring 92, docking lever 68 of docking lever assembly 46 pivots at first and second pivot pins 72, 80 and rotates counterclockwise away from docking pin 66 in notch 64 of receiver bracket 60 of first receiver assembly 26. Once the user has rotated handle 20 such that locking pin 138 of locking lever assembly 42 extends into undocked position opening 27 of first locating plate 21, the user is assured that docking and locking mechanism 12 is now in the undocked position shown in FIGS. 3 and 3A and can move object 10 away from apparatus 16 shown in FIG. 1.

In order to place docking and locking mechanism 12 back into the docked position, the user must perform the reverse operation. The user will start by actuating lever 132 of locking lever assembly 42 to move locking lever assembly 42 from the locked position shown in FIG. 9 to the unlocked position shown in FIG. 8. Actuating lever 132 will draw locking pin 138 of locking lever assembly 42 out of undocked position opening 27 of locating plate 21 in order to move locking lever assembly 42 to the unlocked position. The user will then actuate handle 20 downward from the upward undocked position with a clockwise rotation in order to latch docking lever 68 of docking lever assembly 46 on docking pin 66 in notch 64 of receiver bracket 60 of first receiver assembly 26.

As handle 20 rotates clockwise, first retaining assembly 34 rotates first handle shaft 30 of handle 20 and axle 118 and sheave 120 of eccentric mechanism 50 clockwise. During this rotation, rod 122 of eccentric mechanism 50 will rotate clockwise with sheave 120 in an eccentric motion and toward or into notch 129. As a result, rod 122 also causes first linkage shaft 86 of linkage assembly 48 to rotate clockwise and toward eccentric mechanism 50. The rotation on first linkage shaft 86 causes inner sleeve 88 to also move toward eccentric mechanism 50 and decrease pressure on spring 92. The movement of inner sleeve 88 also causes outer sleeve 94 to compress Belleville washers 89. During this process, docking lever 68 of docking lever assembly 46 pivots at first and second pivot pins 72, 80 and rotates clockwise toward docking pin 66 in notch 64 of receiver bracket 60 of first receiver assembly 26 until it latches around docking pin 66. Once the user has rotated handle 20 such that locking pin 138 of locking lever assembly 42 extends into undocked position opening 27 of first locating plate 21, rod 122 of eccentric mechanism 50 has rotated past center and is locked in place. The user has now actuated docking and locking mechanism 12 from the undocked position shown in FIGS. 3 and 3A to the docked position shown in FIGS. 2 and 2A. Now object 10 is locked in place with respect to apparatus 16 and is fully supported by docking and locking mechanism 12.

Beneficially embodiments of the invention thus provide a docking and locking mechanism having a handle, an eccentric mechanism, a linkage assembly, and a docking lever assembly. A user can unlock a handle using a locking lever assembly and rotate the handle to move the docking and locking mechanism between docked and undocked positions as needed. That is, as the handle rotates, the eccentric mechanism rotates the linkage assembly and causes the docking lever assembly to either engage a docking pin in a docking receiver assembly or disengage the docking pin. This docking and locking mechanism provides an easy, convenient, efficient, and reliable way to dock and lock objects in place. Further, the docking and locking mechanism may be used a variety of different objects or apparatuses and maintain effectiveness. In addition, the docking and locking mechanism allows a user to dock and lock an object for as long as desired.

Therefore, according to one embodiment of the invention, a docking and locking mechanism includes a handle actuatable between a docked position and an undocked position. The docking and locking mechanism further includes an eccentric mechanism including an axle coupled to the handle and configured to rotate about an axis of rotation upon actuation of the handle, a sheave coupled to the axle and configured to rotate about the axis of rotation with the axle, and a rod comprising a first end coupled to the sheave off-center from the axis of rotation and a second end, the rod extending substantially perpendicular to the axis of rotation. Additionally, the docking and locking mechanism includes a linkage assembly including a first linkage shaft coupled to the second end of the rod of the eccentric mechanism, the first linkage shaft comprising a first shaft opening therein; an inner sleeve comprising a first sleeve opening and a second sleeve opening, the inner sleeve positioned over the first linkage shaft and coupled to the first linkage shaft via a first sleeve pin extending through the first sleeve opening in the inner sleeve and the first shaft opening of the first linkage shaft; a second linkage shaft positioned within the inner sleeve and coupled to the inner sleeve via a second sleeve pin extending through a second shaft opening in the second linkage shaft and the second sleeve opening in the inner sleeve; and an outer sleeve positioned over the inner sleeve to retain the first sleeve pin coupling the inner sleeve and the first linkage shaft, the outer sleeve linked to the inner sleeve and the second linkage shaft via the second sleeve pin extending through a third sleeve opening in the outer sleeve. The docking and locking mechanism also includes a docking lever assembly including first and second pivot pins and a docking lever with a first end coupled to the second linkage shaft of the linkage assembly via the first pivot pin extending through a third shaft opening in the second linkage shaft and a first lever opening in the docking lever; a second end comprising a hook shape; and a second lever opening formed therein and sized to receive the second pivot pin therethrough.

According to another embodiment of the present invention, a method of manufacturing a docking and locking mechanism includes constructing a linkage assembly by coupling a first linkage shaft to an inner sleeve via a first sleeve pin extending through a first shaft opening in the first linkage shaft and a first sleeve opening in the inner sleeve, positioning an outer sleeve over the inner sleeve and the first linkage shaft to retain the first sleeve pin in the inner sleeve and the first linkage shaft, and coupling a second linkage shaft to the inner sleeve and outer sleeve via a second sleeve pin extending through a second shaft opening in the second linkage shaft, a second sleeve opening in the inner sleeve, and a third sleeve opening in the outer sleeve. In addition, the method includes coupling a docking lever assembly to the linkage assembly by inserting a first pivot pin through a first lever opening in a docking lever of the docking lever assembly and a third shaft opening in the second linkage shaft. Furthermore, the method includes coupling an eccentric mechanism comprising an axle, a sheave, and a rod to the linkage assembly by coupling the first linkage shaft of the linkage assembly to the rod of the eccentric mechanism, the rod of the eccentric mechanism coupled to the sheave of the eccentric mechanism off-center from an axis of rotation about which the sheave and axle of the eccentric mechanism rotate and coupling a handle to the axle of the eccentric mechanism, the handle actuatable between a docked position and an undocked position.

According to yet another embodiment of the present invention, a docking and locking mechanism including a handle actuatable between a docked position and an undocked position and an eccentric mechanism coupled to the handle, the eccentric mechanism comprising a rod that rotates in an eccentric path upon actuation by the handle. The docking and locking mechanism also includes a linkage assembly with an inner sleeve comprising first and second sleeve openings, an outer sleeve positioned around the inner sleeve and comprising a third sleeve opening, first and second linkage shafts partially positioned within the inner sleeve and comprising respective first and second openings therein, a first sleeve pin extending through the first sleeve opening in the inner sleeve and the first opening in the first linkage shaft, and a second sleeve pin extending through the second sleeve opening in the inner sleeve, the third sleeve opening in the outer sleeve, and the second opening in the second linkage shaft. The docking and locking mechanism further includes a docking lever with a first end coupled to the second linkage shaft of the linkage assembly via a first pivot pin and an elongated opening formed therein and sized to receive a second pivot pin therethrough.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A docking and locking mechanism comprising:

an eccentric mechanism comprising a rod configured to rotate in an eccentric path;

a linkage assembly comprising:

an inner sleeve configured to couple to the rod of the eccentric mechanism; and an outer sleeve configured to slide over and couple to the inner sleeve; and a docking lever configured to couple to the inner sleeve and the outer sleeve of the linkage assembly and to pivot at one or more pivot points.

2. The docking and locking mechanism of claim 1 wherein the linkage assembly further comprises:

a first linkage shaft configured to couple the inner sleeve of the linkage assembly to the rod of the eccentric mechanism; and a second linkage shaft configured to couple the inner sleeve and the outer sleeve of the linkage assembly to the docking lever.

3. The docking and locking mechanism of claim 2 wherein the linkage assembly further comprises:

a first sleeve pin configured to extend through a first sleeve opening in the inner sleeve and a first shaft opening in the first linkage shaft; and a second sleeve pin configured to extend through a second sleeve opening in the inner sleeve, a third sleeve opening in the outer sleeve, and a second shaft opening in the second linkage shaft.

4. The docking and locking mechanism of claim 3 wherein the second sleeve opening in the inner sleeve of the linkage assembly is elongated.

5. The docking and locking mechanism of claim 2 wherein the docking lever comprises:

a first end configured to couple to the second linkage shaft via a first pivot pin configured to extend through a third shaft opening in the second linkage shaft and a first lever opening in the docking lever; and a second end configured to selectively engage a docking receiver assembly.

6. The docking and locking mechanism of claim 5 wherein the docking lever further comprises a second pivot pin configured to extend through a second lever opening in the docking lever.

7. The docking and locking mechanism of claim 6 wherein the second lever opening in the docking lever is elongated.

8. The docking and locking mechanism of claim 5 wherein the second end of the docking lever is hook-shaped.

9. The docking and locking mechanism of claim 1 wherein the eccentric mechanism further comprises:

an axle configured to rotate about an axis of rotation; and a sheave configured to:

couple to the axle to rotate about the axis of rotation with the axle; and couple to the rod off-center from the axis of rotation.

10. The docking and locking mechanism of claim 9 further comprising a handle configured to couple to the axle of the eccentric mechanism and actuate the docking and locking mechanism between a docked position and an undocked position.

11. The docking and locking mechanism of claim 1 wherein:

the inner sleeve further comprises:

a sliding portion comprising a first radius sized to fit within the outer sleeve; and a stopper portion comprising a second radius larger than the first radius; and the linkage assembly further comprises a plurality of Belleville washers configured to slide over the sliding portion of the inner sleeve into a position between the stopper portion of the inner sleeve and the outer sleeve.

12. A docking and locking mechanism comprising:

an eccentric mechanism configured to couple to the handle, the eccentric mechanism comprising an axis of rotation and a rod configured to rotate off-center from the axis of rotation;

a handle configured to couple to the eccentric mechanism and actuate the docking and locking mechanism between a docked position and an undocked position by rotating the eccentric mechanism about the axis of rotation;

a linkage assembly comprising:

an inner sleeve configured to couple to the rod of the eccentric mechanism and comprising first and second sleeve openings;

an outer sleeve sized to fit over around the inner sleeve and comprising a third sleeve opening;

a first sleeve pin sized to extend through the first sleeve opening in the inner sleeve and configured to couple the inner sleeve to the rod of the eccentric mechanism; and a second sleeve pin sized to extend through the second sleeve opening in the inner sleeve and the third sleeve opening in the outer sleeve; and a docking lever configured to:

couple to the inner sleeve and the outer sleeve of the linkage assembly via the second sleeve pin; and selectively latch the docking and locking mechanism into the docked position.

13. The docking and locking mechanism of claim 12 wherein the linkage assembly further comprises a first linkage shaft configured to couple the inner sleeve of the linkage assembly to the rod of the eccentric mechanism via the first sleeve pin; and a second linkage shaft configured to couple the inner sleeve and the outer sleeve of the linkage assembly to the docking lever via the second sleeve pin.

14. The docking and locking mechanism of claim 13 wherein:

the first linkage shaft comprises a first shaft opening sized to receive the first sleeve pin; and the second linkage shaft comprises a second shaft opening sized to receive the second sleeve pin.

15. The docking and locking mechanism of claim 13 wherein:

the docking lever comprises:

a first lever opening configured to receive a first pivot pin; and a second lever opening configured to receive a second pivot pin; and the second linkage shaft comprises a third shaft opening configured to receive the first pivot pin.

16. The docking and locking mechanism of claim 12 wherein the docking lever comprises a hook-shaped end to selectively latch the docking and locking mechanism into the docked position.

17. A docking and locking mechanism comprising:

a handle configured to actuate between a docked position and an undocked position;

an eccentric mechanism coupled to the handle and comprising a rod configured to rotate along an eccentric path upon actuation of the handle;

a linkage assembly comprising:

a first linkage shaft coupled to the rod of the eccentric mechanism;

an inner sleeve coupled to the first linkage shaft via a first sleeve pin extending through a first sleeve opening in the inner sleeve and a first shaft opening in the first linkage shaft, the inner sleeve comprising:

a sliding portion comprising a first radius; and a stopper portion comprising a second radius larger than the first radius; and an outer sleeve positioned over the sliding portion of the inner sleeve; and a second linkage shaft coupled to the inner sleeve and the outer sleeve via a second sleeve pin extending through a second sleeve opening in the inner sleeve, a third sleeve opening in the outer sleeve, and a second shaft opening in the second linkage shaft; and a docking lever coupled to the second linkage shaft of the linkage assembly via a first pivot pin extending through a first lever opening in the docking lever and a third shaft opening in the second linkage shaft, the docking lever configured to:

pivot at the first pivot pin;

pivot at a second pivot pin extending through a second lever opening in the docking lever; and to selectively latch the docking and locking mechanism into the docked position.

18. The docking and locking mechanism of claim 17 wherein the outer sleeve comprises:

a retaining portion comprising a first radius and configured to retain the first sleeve pin in the first sleeve opening of the inner sleeve and the first shaft opening in the first linkage shaft; and a stopper comprising a second radius larger than the first radius of the retaining portion.

19. The docking and locking mechanism of claim 17 wherein the handle comprises a retaining assembly positioned on the eccentric mechanism and comprising:

a collar comprising first and second edge openings on opposing sides thereof and a central opening connecting the first and second edge openings;

first and second taper locks positioned within the collar through the first and second openings, respectively, up to the central opening; and first and second flanges coupled to the collar at the first and second openings, respectively, to create a friction clamp on the first handle shaft and the axle of the eccentric mechanism.

20. The docking and locking mechanism of claim 17 further comprising a locating plate comprising a docked position opening and an undocked position opening;

wherein the handle comprises a locking lever assembly, the locking lever assembly comprising:

a locking pin sized to extend through the docked position and undocked position openings in the locating plate and configured to lock the handle in the docked position and undocked position when extending through the docked position and undocked position openings, respectively, of the locating plate;

a lever; and a linkage plate coupling the lever and the locking pin such that when the lever is actuated, the linkage plate moves the lock pin through either the docked position opening or the undocked position opening of the locating plate.

* * * * *